3,013,914
TEREPHTHALIC ACID COPOLYESTER COMPOSITIONS

Anne Willard, Elwyn, Pa., assignor to E. I. du Pont de Nemours and Company, Wilmington, Del., a corporation of Delaware
No Drawing. Filed Mar. 11, 1958, Ser. No. 720,547
13 Claims. (Cl. 154—43)

This invention relates to terephthalic acid copolyester compositions and laminated assemblies adhesively bonded therewith. More particularly the invention relates to the fusible resinous esterification product of a mixed dicarboxylic acid reactant composed essentially of a major molar proportion of an aromatic dicarboxylic component comprising terephthalic acid and a minor molar proportion of an aliphatic dicarboxylic component composed essentially of at least one alkanedicarboxylic acid and a mixed aliphatic diol reactant comprising a major molar portion of a low molecular weight alkanediol and significant minor molar proportion of a polyoxyalkylene glycol component consisting essentially of polytetramethylene ether glycol.

These copolyester products are characterized by unusual thermal stability properties. For example, laminated assemblies having these copolyester products as the adhesive layer are resistant to delamination under frigid conditions at temperatures as low as —20° F. Copolyesters of this type formulated with an adequately high melting point and used as the adhesive in laminated metal assemblies, such as the side-seam of sheet metal can-body shells, are resistant to steam sterilization conditions of at least one hour at 270° F. These copolyester adhesives are also resistant to the conditions associated with heat-processing and pasteurization of wet-pack food products and beverages which are processed in the sanitary metal can customer package, as well as being stable under frigid storage conditions.

Terephthalic acid polyesters are known in the adhesive art and in the field of extruded fibers and films. Certain types of terephthalic acid polyesters have been found to have a desirable balance of properties for laminating "Mylar" polyester film to itself or to different substrates. Numerous useful terephthalic acid polyester adhesives and laminates adhesively bound therewith are described in Williams U.S. Patents 2,765,250 and 2,765,251. These prior art polyesters and the method of their preparation are described and claimed in Snyder U.S. Patents 2,623,031 and 2,623,033. Copending application Buck et al. Serial No. 608,251, filed September 6, 1956, now U.S. Patent 2,876,725, relates to the use of certain terephthalate copolyester as a metal solder replacement for adhesively sealing the sideseams of sheet metal can body shells.

Although the terephthalic acid polyesters described in the aforementioned patents and pending application are significantly useful as adhesives and offer many desirable advantages over ordinary fusible resinous polyester adhesive compositions, there is a recognized need for improvement in these adhesives to provide assemblies laminated therewith which adequately resist exposure to the aforementioned extreme conditions of —20° F. and +270° F. for a prolonged period of time. For example, when terephthalate polyester adhesives are formulated according to prior art teachings to have a high melting point, adequate for use as an adhesive-sealant in the seams of a sheet metal container having utility as a sanitary can for wet-pack food products heat-processed in the container-package, these polyesters ordinarily become significantly brittle at low temperatures and adhesion is poor at frigid temperatures such as —20° F. Many of the prior art terephthalate polyester adhesives formulated to have a moderate melting point without conformance to the requirement of resistance to sterilization conditions also exhibit adhesion failure or substantial loss in bond strength at —20° F. in comparison with the adequate results obtained at room temperature.

The primary object of this invention is to provide terephthalic acid copolyester compositions which exhibit significantly improved characteristics in reference to these aforementioned deficiencies exhibited by the terephthalate polyesters of the known art. An equally important object is to provide terephthalic acid copolyester compositions which as a bonding cement provides adhesively bound assemblies or laminates which are significantly retentive in bond strength and are resistant to delamination under frigid conditions, temperatures being as low as —20° F. A further object is to provide laminated assemblies adhesively bonded with these frigid-stable terephthalic acid copolyesters which are additionally resistant to steam sterilization and heat-processing conditions associated with commercial food canning where a temperature of as high as 270° F. is ordinary. A particularly specific object is to provide a sheet-metal tubular can-body shell having a solder-free interlocked side-seam having the terephthalic acid copolyester product confined in the seam-cavity as an adhesive-sealant which resists exposure to thermal conditions of from —20° F. to 270° F. and exposure to the physical and chemical conditions associated with ordinary wet-pack food canning operations.

These important objects are accomplished by preparing a fusible terephthalic acid copolyester by esterification of a mixed dicarboxylic reactant composed essentially of 55 to 95, preferably 67 to 88, mol percent of (A) at least one aromatic dicarboxylic component, each having in the molecule 1 to 2 phenylene groups each having at least one directly attached carboxyl substituent, two carboxyl substituents on the same phenylene group being attached to non-adjacent atoms of the phenylene group, at least 33 mol percent, preferably at least 55 mol percent, being terephthalic acid; and correspondingly 45 to 5, preferably 33 to 12, mole percent of (B) a saturated aliphatic dicarboxylic component composed essentially of at least one alkanedicarboxylic acid having the two carboxyl substituents thereof separated by a connecting carbon chain of 4 to 10 carbon atoms; and a mixed aliphatic diol reactant composed essentially of 3 to 20, preferably 5 to 15, mol percent of (C) a polyoxyalkylene glycol component consisting essentially of polytetramethylene ether glycol, the average molecular weight of component (C) being from about 500 to 3000, and correspondingly 97 to 80, preferably 95 to 85, mol percent of (D) at least one alkanediol having the hydroxyl substituents thereof separated by a connecting carbon chain of 2 to 4 carbon atoms, ethylene glycol being particularly preferred.

The aromatic dicarboxylic component (A) can be either solely terephthalic acid or a mixture of terephthalic acid with at least one other aromatic dicarboxylic acid having from 1 to 2 carboxy-substituted phenylene groups per molecule, the respective carboxyl substituents being attached directly to a benzen ring carbon atom. Useful monophenylene dicarboxylic acids have the carboxyl substituents attached to non-adjacent carbon atoms. Use of ortho-dicarboxylic acids, such as orthophthalic acid, except for an insignificant proportion up to several mol percent is avoided. Useful dicarboxylic acids containing two carboxy-substituted phenylene groups per molecule have the carboxyl substituents preferably in the respective 4 positions, namely the para positions. Typical useful aromatic dicarboxylic acids of these described categories are: terephthalic acid, isophthalic acid, bibenzoic acid, ethylene-bis-paraoxybenzoic acid, trimethylene - bis - paraoxybenzoic acid, tetramethylene-bis-paraoxybenzoic acid, and acids of the general formula

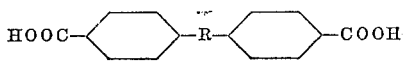

where R is a saturated aliphatic divalent radical containing from 1 to 4 carbon atoms, such as for example methylene, ethylene, trimethylene, tetramethylene and isopropylidene.

Representative aliphatic dicarboxylic acids useful as component (B) in formulating the copolyester composition include the following: adipic acid, pimelic acid, suberic acid, azelaic acid, sebacic acid, 2-ethyl suberic acid, 4n-propyl suberic acid, β-methyl-β'-ethyl suberic acid, 2,5 diethyl adipic acid, nonane 1,9 dioic acid, decane 1,10 dioic acid and cyclohexane-1,4 dioic acid. These useful dicarboxylic acids include species in which the linear carbon chain connecting the two carboxyl substituents have extralinear saturated hydrocarbon substituents which contain up to a total of 4 extralinear carbon atoms.

The polyoxyalkylene glycol component (C) consists essentially of at least one polytetramethylene ether glycol, also referred to as PTMEG, having an average molecular weight from about 500 to 3000, preferably 700 to 1800. Polytetramethylene ether glycol is represented by the empirical formula $HO[CH_2CH_2CH_2CH_2O]-_nH$ where $n$ is an integer having a value of at least 2 and which ordinarily may be as high as 50. Commercially available PTMEG is a mixture of species having the indicated empirical formula.

Although component (C) preferably consists solely of polytetramethylene ether glycol, a minor proportion of another water-insoluble polyoxyalkylene glycol can be present, the mixture containing at least 80 mol percent of polytetramethylene ether glycol. Polyoxyalkylene glycols of propylene glycol, 1,3 propanediol, 1,5 pentanediol and 1,6 hexanediol are typical useful water-insoluble species which can be mixed with PTMEG. Polyoxyethylene glycols and mixed ether polyoxyalkylene glycols derived from mixtures of ethylene glycol and propylene glycol or their respective alkyleneoxides are too water-sensitive to be useful and these polymeric materials ordinarily decompose under the conditions used in melt polymerization techniques for preparing the terephthalate copolyesters.

Representative alkanediols useful as component (D) in formulating the copolyester include for example: ethylene glycol, propylene glycol, propanediol 1,3, butylene glycol 1,3, tetramethylene glycol, and neopentyl glycol. Component (D) preferably is either ethylene glycol or mixtures of the aforementioned alkanediols in which at least 50 mol percent is ethylene glycol.

Use of ethylene glycol as component (D) links the pertinent dicarboxylic components of the copolyester with a connecting chain of minimum weight contribution. Component (C) provides a significant weight contribution without significant alteration in molar proportions. A desirable weight ratio of component (C) is from 1 to 6, preferably 1.3 to 4, parts per part by weight of component (D).

The preparation of these copolyesters follows the general melt polymerization technique described in Snyder U.S. Patent 2,623,031 which comprises heating the methyl esters of the respective dicarboxylic acids in the molten state at atmospheric pressure and at a temperature of from about 302° F. (150° C.) to 437° F. (225° C.) in the presence of an ester interchange catalyst, calcium acetate being typical. After evolution of the methanol liberated during the ester interchange reaction is complete, heating of the resulting monomeric bis-dihydric alcohol esters in the presence of a condensation catalyst is continued under reduced pressure, such as from about .05 to 3 millimeters of mercury at a higher temperature, such as from about 437° F. (225° C.) to 527° F. (275° C.) preferably about 482° F. 250° C.) until the resulting copolyester has an inherent viscosity of from .4 to 1.5, preferably .6 to 1.1. The inherent viscosity is based on a solution of .6 gram of the copolyester in 100 milliliters of m-cresol. The inherent viscosity is calculated from the equation $$\text{Inherent viscosity} = \frac{\log_e V_R}{c}$$

where $V_R$ is the viscosity of the indicated viscosity test solution divided by the viscosity of m-cresol expressed in the same viscosity units and at the same temperature, $c$ being .6 for the indicated solution. This equation reduces to the following basis using common logarithms $\log_{10}$ for $\log_e$:

$$\text{Inherent viscosity} = 3.838 \times \log_{10} V_R$$

The invention terephthalate acid copolyester products can be applied as an adhesive in the form of either a hot-melt, a solution in volatile organic solvent for the copolyester, a preformed bonding tape of the copolyester in the form of a ribbon or film cast either from molten copolyester or from a solution of the copolyester in a volatile organic solvent, or a preformed pellicular laminating component consisting of a pellicular lamina having a coating of the copolyester on the surface thereof. In forming laminates, the respective laminae are assembled with a bonding layer of the terephthalate copolyester separating the respective laminae of the assembly, that is, alternating X layers of laminae and X—1 layers of the copolyester adhesive, X being at least 2. When the bonding layer is applied as a hot-melt or as a preformed ribbon, the assembly is subjected to heat and pressure to in situ fuse the thermoplastic copolyester and thereafter the assembly is allowed to cool. When the bonding layer is applied from organic solvent solution, the solvent in the wet layer of the applied copolyester adhesive solution ordinarily is substantially volatilized before the laminate assembly is made. For some purposes, the laminate can be satisfactorily completed by subjecting the assembly having a solvent-wet layer of the copolyester to pressure without applying heat sufficient to fuse the applied thermoplastic copolyester.

The following examples are illustrative of particularly practical embodiments of the invention. The indicated parts or percentages are on a weight basis unless specifically indicated otherwise.

*Example 1*

| | Parts by weight |
|---|---|
| Dimethyl terephthalate | 48.7 |
| Dimethyl sebacate | 10.2 |
| Ethylene glycol | 38.4 |
| PTMEG 1005 mol. wt | 44.5 |
| Total charge | 141.8 |
| Copolyester product | 100. |
| Methanol removed | 18.9 |
| Ethylene glycol removed | 22.9 |

PTMEG is used to designate polytetramethylene ether glycol.

During the ester-interchange reaction, the charge included .15 part of calcium acetate as the catalyst and during the copolymerization reaction, the charge additionally included .05 part of antimony trioxide as the catalyst.

The relative proportions of the mixed dicarboxylic reactant are 85 mol percent terephthalic acid and 15 mol percent of sebacic acid. After accounting for the liberated excess ethylene glycol, the relative proportions of the mixed diol reactant are about 85 mol percent ethylene and about 15 mol percent of polytetramethylene ether glycol.

In carrying out the copolymerization, the ingredients were charged into a reaction vessel provided with distillation and agitation means and blanketed with an atmosphere of nitrogen. The charge was heated at atmospheric pressure with moderate agitation until the pot temperature was 437° F. and the vapor temperature was about 374° F. indicating that the released methanol is exhausted. Heating was continued under reduced pressure, about .2 to 1 millimeter of mercury, at about 482° F. (250° C.), removing excess ethylene glycol as a distillate, until the resulting copolyester had the desired viscosity and then the product is cooled to room temperature.

The copolyester product was characterized as follows:

| | |
|---|---|
| Inherent viscosity | 0.855 |
| Stick melting point °F | 333 |
| Penetration ASTM-D-5-52 mm | 0.8 |
| Peel strength on tin plate pounds | 28.8 |

Duplicate products copolymerized to inherent viscosities of 0.62 and .718 respectively exhibited peel strengths of 24. and 26.1 pounds per .75 inch linear respectively.

Substitution of either dimethyl azelate or dimethyl adipate for dimethyl sebacate on an equal molar basis in the composition represented by Example 1 results in copolyesters of comparable characteristics.

The penetration was determined by the ASTM D-5-52 asphalt method applying a load of 150 grams for 10 seconds at 25° C.

In carrying out the peel strength test, two electrolytic tinplated panels one of which measures 6 x 8 inches and the other 6 x 5 inches were washed with toluene and heated for 10 minutes in a 400° F. oven to remove oil. Then the terephthalate copolyester adhesive as a 20% solution in 1,1,2 trichloroethane was applied with a doctor blade in sufficient amount to provide a dry adhesive film 1.5 mils thick covering an area 3 inches long substantially the 6 inches width of the respective panels. The adhesive coated panels were air-dried for 60 minutes, heated in a 212° F. (100° C.) oven for 10 minutes, and allowed to cool to room temperature. A laminate was formed by superimposing the adhesive-coated area of one panel on the adhesive-coated area of the other panel in such manner that the bonding area common to both panels is 3 inches long, heating the assembly to a temperature about 30° F. above the stick melting point for 1 minute in a Carver press, applying a pressure of about one to two pounds for 10 seconds and removing the laminate from the press. The laminate was cut into strips .75 inch wide, having an adhesive-bonded area .75 x 3 inches, the unbonded areas, one long tongue and one short tongue, serving as gripping surfaces in carrying out the peel test. The long tongue of uncoated metal was bent through 180° to thereby in combination with the short tongue provide the test specimen with gripping surfaces at opposite ends of the laminate. These opposing tongues were gripped in the jaws of an Instron tester, the portion of the specimen supported by the stationary jaw being backed by an iron bar to maintain the specimen in a vertical position, and the movable jaw was caused to separate from the stationary jaw at the rate of 12 inches per minute. By this action, the folded tongue is peeled from the laminate with the peel strength being measured.

A comparative terephthalate polyester product, representative of the known art, formulated with a mixed dicarboxylic reactant composed of 55 mol percent of terephthalic acid and 45 mol percent of sebacic acid and a diol reactant composed solely of ethylene glycol and copolymerized to an inherent viscosity of 0.70 exhibited the following characteristics:

| | |
|---|---|
| Stick melting point | 262° F. |
| Penetration ASTM D-5-52 | 0.75 mm. |
| Peel strength on tin plate-room temp | 29.5 pounds per .75 inch. |
| Tensile strength at break (room temp.) | 1592 p.s.i. |
| Percent elongation at break (room temp.) | 743. |
| Tensile strength at break (−20° F.) | 4681 p.s.i. |
| Percent elongation at break (−20° F.) | 127. |

Example 2

| | Parts by wt. |
|---|---|
| Dimethyl terephthalate | 43.9 |
| Dimethyl isophthalate | 20.1 |
| Dimethyl sebacate | 4.0 |
| Ethylene glycol | 46.3 |
| PTMEG 1005 mol. wt | 34.9 |
| Total charge | 149.2 |
| Copolyester product | 100. |
| Methanol recovered | 22.2 |
| Excess ethylene glycol recovered | 27.0 |

The ester-interchange and copolymerization was carried out as described in Example 1 using the same catalysts in the same proportions.

The copolyester composition corresponds to the reaction product of a mixed dicarboxylic acid reactant composed of 75 mol percent terephthalic acid, 20 mol percent isophthalic acid and 5 mol percent sebactic acid and a mixed diol reactant composed of 90 mol percent ethylene glycol and 10 mol percent polytetramethylene-ether glycol.

The copolyester is characterized as follows:

| | |
|---|---|
| Inherent viscosity | 0.827. |
| Stick melting point | 286° F. |
| Penetration ASTM D-5-52 | 0.53 mm. |
| Peel strength—room temp | 33.4 pounds per .75 inch. |

A specimen tin-plate laminate prepared as described above for the peel test was subjected to steam at 250° F. for 75 minutes simulating conditions encountered in wet-pack food processing. After two days recovery from these conditions, the peel strength was 31.8 pounds per .75 inch.

Example 3

| | Parts by wt. |
|---|---|
| Dimethyl terephthalate | 45.7 |
| Dimethyl sebacate | 23.2 |
| Ethylene glycol | 44.9 |
| PTMEG mol. wt. 1005 | 33.8 |
| Total charge | 147.6 |
| Copolyester product | 100. |
| Methanol recovered | 21.55 |
| Excess ethylene glycol recovered | 26.05 |

The ester-interchange reaction and the copolymerization were carried out as described in Example 1 using the same concentrations of catalysts.

The composition of the copolyester corresponds to the reaction product of a dicarboxylic reactant composed of 70 mol percent of terephthalic acid and 30 mol percent of sebacic acid and a mixed diol reactant composed of 90 mol percent of ethylene glycol and 10 mol percent of polytetramethylene ether glycol.

The copolyester product is characterized as follows:

| | |
|---|---|
| Inherent viscosity | 1.04 |
| Stick melting point | 306° F. |
| Penetration ASTM D-5-52 | 0.65 mm. |
| Peel strength (room temp.) | 46.7 pounds per .75 inch. |
| Tensile strength at break—room temp. | 1411 p.s.i |
| Percent elongation at break—room temp | 756%. |
| Peel strength (−20° F.) | 50.6 pounds per .75 inch. |
| Tensile strength at break (−20° F.) | 4541 p.s.i. |

Percent elongation at break
(—20° F.) _____ 502%.
Peel strength (after steaming)__ 43.7 pounds per .75 inch.

The steamed specimen was subjected to steam at 250° F. for 75 minutes and then allowed to recover for three days at room temperature.

In contrast with the product of Example 3, the described comparative terephthalate polyester which exhibited comparable tensile strength properties at room temperature had a stick melting point below the 270° F. sterilization temperature and exhibited an elongation at the break at —20° F. of 127% and significantly lower peel strength in reference to tin-plated sheet steel. An increase in the terephthalic acid content of the comparative polyester to adequately increase the stick melting point above the sterilization temperature results in still lower peel strengths to amplify the differences between the adhesive characteristics of the comparative polyester and the product of Example 3.

This copolyester product of Example 3 is particularly preferred as the adhesive-sealant in the side-seams of tin-plated sheet steel can bodies fabricated without metal soldering as described in the following paragraphs.

In sanitary can fabrication tin-plated sheet steel is supplied in a roll and the ribbon of metal therefrom is coated on one side with a sanitary can varnish ordinarily applied by roller coating in a patterned manner whereby certain appropriate areas of the metal ribbon remain uncoated. These uncoated metal areas correspond to the two seam-formable portions of can-body blanks when said blanks are subsequently stamped from the varnish coated metal ribbon after being passed through an oven to bake the varnish. A can-body shell is fabricated from the stamped flat metal blank by forming the two seam-formable portions of the blank into a pair of interengageable seam hooks and forming the blank into a partially completed tubular shell having the varnish coating on the interior surface thereof, supplying seam-sealing adhesive to at least one of the two seam hooks, interengaging the two seam hooks, mechanically locking the seam and thereby confining the adhesive in the seam cavity formed by the interengaged and locked seam hooks, heating to fuse in situ the confined adhesive, preferably at a temperature 20° F. to 40° F. above the stick melting temperature of the adhesive, and finally cooling to room temperature.

When the melt temperature of the adhesive is above the baking temperature of the varnish, the adhesive can be applied to the metal ribbon either concurrently with or immediately subsequent to varnish application, prior to baking and stamping of the blanks from the metal ribbon. Alternatively, the adhesive can be applied to the seam-formable portions of the metal ribbon or stamped flat metal can-body blank subsequent to baking of the varnish, prior to forming the engageable seam hooks. The adhesive in the form of a solvent-free hot-melt can be conveniently applied in any of the above-described sequences. In the form of a solution in volatile solvent, the copolyester adhesive is necessarily applied to the metal ribbon or flat blank because ordinary speeds of can fabrication do not provide for adequate volatile loss of solvent when the adhesive solution is applied to formed seam hook in the can-forming machine. Another alternative method is to apply the adhesive as a preformed dry solid ribbon of appropriate dimensions to conform with the surface area of the seam-formable portion of the metal blank and the volume of the seam-cavity, heating the metal sufficient to fuse the surface of the adhesive ribbon and thereby on cooling adequately anchoring the adhesive ribbon to the metal with sufficient tenacity to resist delamination of the adhesive ribbon during the subsequent mechanical steps of fabricating the seamed tubular body shell.

The resulting tubular can-body shell having the interior surface thereof varnish-coated and having a solder-free, adhesively-sealed body side-seam is flanged at the open ends thereof to receive end-closures. In fabricating a sanitary can from the completed can-body shell, an end-closure stamped from a ribbon of varnish-coated, tin-plated sheet steel similar to that described above is double-seamed to one end of the body shell. The stamped end-closure has an annular groove conforming with the flange of the body shell. This groove ordinarily contains a conventional organic sealing compound for end-closures which functions primarily as a sealant rather than as an adhesive. When the resulting can is filled, a similar end-closure is double-seamed to the remaining open-end of the can-body shell to complete the can package.

Although the above described pattern of steps is directed to fabrication of interiorly varnish-coated tin-plated sheet steel sanitary cans for use in wet-pack food and beverage packaging, the same pattern of fabrication steps except for omission of the varnish application and baking steps can be used in fabricating cans for packaging lubricating oils, paints, non-corrosive organic liquids and the like. For such packaging purposes, black iron, terne-plate, aluminum and other sheet metals can be used in place of the tin-plated sheet steel.

The architecture and fabrication of ordinary tubular tin-cans having a soldered body seam are described in detail in "The Canned Food Reference Manual" Second Edition 1943, published by the American Can Company, Chapter 4, pages 45 to 52.

Modification of these fabrication techniques wherein metal solder is replaced by an organic sealant is representatively described in Campbell et al. U.S. Patent 2,730,983.

The copolyester product of Example 3 used as the adhesive in fabricating sanitary cans having an adhesively-sealed, solder-free body side-seam as described above is chemically resistant to the aqueous extracts associated with wet-pack food products and beverages heat-processed and pasteurized in the can and substantially retains its physical characteristics under processing and storage conditions. For example, the empty cans were steam-sterilized for 75 minutes at 270° F. prior to filling with representative food products such as sour cherries, pumpkin, corn and pork which were heat-processed in the can under their respective ordinary conditions ranging in temperature from 210° F. to 250° F. for a period of from 15 to 150 minutes. Immediately after heat-processing, the cans were hermetically sealed, cooled and stored. None of the sealed containers developed leakage during processing or during storage at temperatures from —20° F. to 120° F.

*Example 4*

| | Parts by wt. |
|---|---|
| Dimethyl terephthalate | 57.6 |
| Dimethyl isophthalate | 6.4 |
| Dimethyl sebacate | 4.0 |
| Ethylene glycol | 34.9 |
| PTMEG 1005 mol. wt. | 46.3 |
| Total charge | 149.2 |
| Copolyester product | 100 |
| Methanol recovered | 22.2 |
| Excess glycol recovered | 27.0 |

The preparation of this copolyester followed the procedure outlined in Example 1. The composition of the product corresponds to the esterification product of a mixed dicarboxylic acid reactant composed of 85.5 mol percent terephthalic acid, 9.5 mol percent isophthalic acid, and 5 mol percent sebacic acid; and a mixed diol reactant composed of 90 mol percent ethylene glycol and 10 mol percent of the polytetramethylene ether glycol.

The copolyester product is characterized as follows:

Inherent viscosity _____ 0.789.
Stick melting point _____ 351° F.
Penetration ASTM D–5–52 ____ 0.23 mm.
Peel strength _____ 8.9 pounds per .75 inch.

Example 5

| | Parts of wt. |
|---|---|
| Dimethyl terephthalate | 46.6 |
| Dimethyl isophthalate | 10.0 |
| Bis (2 hydroxyethyl) isosebacate 96% | 15.5 |
| Ethylene glycol | 37.9 |
| PTMEG 1005 mol. wt | 34.5 |
| Total charge | 144.5 |
| Copolyester product | 100. |
| Methanol recovered | 18.7 |
| Excess ethylene glycol recovered | 25.8 |

The bis (2 hydroxyethyl) isosebacate was prepared by esterifying "Isosebacic" acid with excess ethylene glycol, the esterification product being 96% monomeric diester and 4% excess ethylene glycol. "Isosebacic" acid is a commercially available mixture of saturated aliphatic $C_{10}$ dicarboxylic acids having the following composition by weight.

| | Percent |
|---|---|
| 2 ethyl suberic acid | 72–80 |
| 2,5 diethyl adipic acid | 12–18 |
| Sebacic acid | 6–10 |
| | 100 |

Preparation of the mixed monomeric esters and copolymerization of the esters followed the general procedure outlined in Example 1 to an inherent viscosity of 0.75.

The copolyester composition corresponds to the esterification product of a mixed dicarboxylic acid reactant composed of 70 mol percent terephthalic acid, 15 mol percent isophthalic acid and 15 mol percent of mixed isomers of saturated aliphatic $C_{10}$ dicarboxylic acids; and a mixed diol reactant composed of 90 mol percent ethylene glycol and 10 mol percent of the polytetramethylene ether glycol.

The characteristics and performance of this copolyester as an adhesive are comparable with those of the adhesive product of Example 2.

In addition to the above-described specific uses for the invention copolyester products, the example products have been found useful in preparing pellicular laminating components by applying a thin layer of the copolyester to one or both surfaces of a heat-resistant pellicular lamina such as "Mylar" polyester film of ethylene terephthalate described in U.S. Patent 2,465,319, cellophane, paper and meta foil. By the term "heat-resistant" is meant that the pellicular lamina is not significantly degraded by exposure to heat sufficient to fuse in situ a thin layer of the terephthalate copolyester. The resulting heat-sealable laminating component or adhesive tape can be used for a multitude of purposes.

Practical uses for these laminating components include the following typical examples. A ribbon of "Mylar" polyester film precoated on both sides with a thin coating of the copolyester product of Example 2 was used to heat-seal sheets of "Mylar" polyester film in producing sheets of larger dimensions used in fabricating light weight greenhouses, temporary shelters and the like which are exposed to the weather ranging from frigid to tropic temperatures. The heat-sealing temperature was 20° to 50° F. above the melt temperature. There was no delamination at the laminated seams under the indicated weather exposure conditions.

Aluminum foil was coated on each side with about a 3 mil coating of the copolyester product of Example 3. This resulting pellicular laminating component was placed on the gluing surface of a wooden work piece of ordinary pine box wood, the gluing surface of a second similar wooden work piece was superimposed on the placed laminating component and the resulting assembly was clamped with a C-clamp as in ordinary wood-gluing. About one square inch of wood surface was in contact with one face of the laminating component and about one square inch of wood surface was in contact with the opposite face of the laminating component. A thermocouple was embedded at the glue line. The metal foil laminating component extended beyond the glue line to permit contact with an electrical source of energy. A current of 80 amperes was passed through the metal foil to rapidly raise the temperature to about the stick melt temperature of the copolyester and the current passage was continued for about 10 seconds until the temperature was about 30° F. above the melt temperature, the total heating time being about 35 seconds. Alternatively, the laminating component can be a pellicular heat-resistant, non-metallic lamina having adhesive on both surfaces with the step of in situ fusing being carried out by dielectric heating. Immediately on stoppage of the current, the laminated assembly was released by removal of the C-clamp. Thereafter the laminated assembly was allowed to cool to room temperature. The sheet strength of the resulting laminated assembly was 380 pounds using a Scott tester with the jaw being separated at a rate of 9 inches per minute. At this sheer value, the failure was by wood failure rather than delamination.

Comparable assemblies laminated with the copolyester product of Example 3 were more rigid and the laminated wood pieces were more difficult to separate from the assembly in comparison with similar assemblies wherein nails were used as the fastening means as in the ordinary fabrication of wooden pallets, boxes and crates. A wooden pallet fabricated with the described tin foil laminating component having the copolyester product of Example 3 as the adhesive coating being the sole means of fastening the wood pieces withstood ordinary abuse in use and did not delaminate during exposure to frigid weather conditions.

In another novel use, a high strength paper bag of the type ordinarily closed by sewing with thread or cord and used in the packaging of Portland cement, lime, dry fertilizer, particulate dry chemicals and the like was coated at the closure area with the copolyester product of Example 5 to provide a narrower sealing band of adhesive. The bag filled with Portland cement was tightly closed without stitching by heat-sealing the applied band of adhesive. The completed stitchless-closed package withstood ordinary abuse to which such packages are subjected during delivery and storage without rupture of the closure. The stitchless bag closure did not delaminate under frigid storage and handling conditions.

For uses where the high temperature thermal characteristics, such as a high melt temperature and high temperature stability, are not pertinent and only low temperature thermal properties are important, as for example in the case of the bag closure, the content of terephthalic acid component of the copolyester can be as low as 33 mol percent and the total content of the aromatic dicarboxylic component can be as low as 55 mol percent.

Although the described copolyesters for adhesive purposes preferably are used in hot-melt form free from volatile solvents, they can also be used as solution type products dissolved in a suitable solvent for the copolyester. Suitable solvents to provide practical solutions having a content of from 5% to 25% of the copolyester at a satisfactory working consistency include for example sym-tetrachloroethane; 1,1,2 trichloroethane, methylene chloride, dioxane, tetrahydrofuran, chloroform, mixtures of dioxane containing up to an equal weight of toluene, and mixtures of dioxane containing up to 4 parts of methyl ethyl ketone per part of dioxane. These solvents can also be used if desired for solvent activation of the copolyester adhesive in place of heat-activation. These solutions of the copolyester can be used as surface coating compositions in addition to having utility as adhesives. If desired, pigments, fillers, extenders and dyes can be incorporated with the copolyester in ordinary proportions. The copolyester product can also be further modified with minor proportions of compatible resins and plasticizers, but the copolyesters preferably are used without modification with these ancillary components.

While there are described above only a limited number of preferred embodiments of the products and processes of the invention, it is possible to produce still other novel embodiments without departing from the inventive concept disclosed and it is desired therefore that only such limitations be imposed on the appended claims as are stated therein or are required by the prior art.

I claim:

1. A terephthalate copolyester composition consisting essentially of copolyester of a plurality of dicarboxylic acids and a plurality of alpha, omega saturated aliphatic diols, said dicarboxylic acids on a molar basis consisting essentially of 55 to 95 mol percent of (A) at least one benzenedicarboxylic acid selected from the group consisting of terephthalic and mixtures of isophthalic and terephthalic acids including at least 33 mol percent of said terephthalic acid, and complementally 45 to 5 mol percent of (B) at least one $C_6$ to $C_{12}$ alpha, omega saturated aliphatic dicarboxylic acid, said diols on a molar basis consisting essentially of 3 to 20 mol percent of (C) a water-insoluble polyoxyalkylene glycol consisting essentially of polytetramethyleneether glycol having an average molecular weight in the range of 500 to 3000 and complementally 97 to 80 mol percent of (D) an alkanediol composition consisting essentially of a member selected from the group consisting of ethylene glycol and mixtures thereof with $C_3$—$C_4$ alpha, omega saturated aliphatic diols including at least 50 mol percent of ethylene glycol, the weight ratio of (C) to (D) being in the relative proportions of 1 to 6 parts of said polytetramethylene ether glycol per part by weight of said alkanediol composition, said polyester being characterized by an inherent viscosity in the range of 0.4 to 1.5 based on 0.6 gram of said polyester in solution in 100 milliliters of m. cresol.

2. A terephthalate copolyester composition of claim 1 wherein said components of said copolyester are in the following molar proportions:

67 to 88 mol percent of (A) said benzenedicarboxylic acid including at least 55 mol percent of terephthalic acid, 33 to 12 mol percent of (B) at least one said $C_6$ to $C_{12}$ alpha, omega saturated aliphatic dicarboxylic acid, 5 to 15 mol percent of (C) said polyoxyalkylene glycol consisting essentially of poly-tetramethylene-ether glycol characterized by an average molecular weight in the range of 700 to 1800, and 95 to 85 mol percent of (D) said alkanediol consisting essentially of ethylene glycol.

3. A terephthalate copolyester composition of claim 2 wherein said components of said copolyester consist essentially of said (A) component, (B) said aliphatic dicarboxylic acid consisting essentially of at least one $C_{10}$ saturated aliphatic dicarboxylic acids and (C) component and said (D) component, the weight ratio of (C) to (D) being in the relative proportions of 1.3 to 4 parts of said polytetramethylene-ether glycol per part by weight of ethylene glycol.

4. A copolyester composition of claim 3 wherein said components of said copolyester consist essentially of the following:

70 mol percent of (A)—terephthalic acid,
30 mol percent of (B)—sebacic acid,
10 mol percent of (C) said polytetramethylene-ether glycol, and
90 mol percent of (D) ethylene glycol, the inherent viscosity of said polyester being from 0.6 to 1.1.

5. A sheet metal tubular can body having an adhesively sealed side-seam defined by a laminated assembly of two interlocked metal seam-hooks having an adhesive composition substantially filling the space enclosed by said interlocked seam-hooks, said adhesive composition being a terephthalate copolyester composition defined by claim 2.

6. A laminated assembly consisting essentially of a purality of heat-resistant hydrophobic laminae, each said lamina having a continuous layer of fusible copolyester adhesive up to several mils thickness adhesively contiguous therewith, said adhesive layer being also adhesively contiguous with a second lamina, said fusible copolyester adhesive consisting essentially of the copolyester product of claim 1 and said heat-resistant laminae having the characteristic of being resistant to temperatures at least 50° F. above the stick melting point of said copolyester.

7. A method of preparing a laminated assembly resistant to delamination on exposure to atmospheric conditions having a temperature as low as −20° F. and steam sterilization conditions at a temperature up to 270° F. which comprises the steps of forming a dry assembly of laminatable components consisting essentially of a first layer of a heat-resistant hydrophobic lamina, a preformed pellicular laminating adhesive component having one copolyester adhesive coated face thereof contiguous with the gluing area of said first layer, and a second layer of a heat-resistant hydrophobic lamina having the gluing area thereof contiguous with the copolyester adhesive coated second face of said preformed pellicular adhesive component, clamping said dry assembly with pressure sufficient to stably immobilize the components of said dry assembly, supplying heat to said pellicular adhesive component at a rate sufficient to rapidly fuse in situ the fusible copolyester adhesive coating on the two faces of said pellicular laminating component, cooling the fused adhesive to a temperature below the melt temperature thereof, and removing the clamps from the resulting laminated assembly, said preformed pellicular laminating adhesive component consisting of a pellicular heat-resistant hydrophobic lamina having on each of the two faces thereof a thin continuous coating of dry, normally non-tacky, fusible copolyester adhesive consisting essentially of the fusible copolyester product of claim 2 and said heat-resistant laminae having the characteristic of being resistant to temperatures for activating said copolyester at least 50° F. above the stick melting point of said copolyester.

8. The laminated product of claim 6 having two said laminae, of which at least one said lamina is ethylene terephthalate polyester film.

9. A sheet metal tubular can body-shell having as a solder-free adhesively-sealed side-seam, a laminated assembly of two interlocked metal seam-hooks containing adhesive-sealant confined in the seam-cavity defined by the interlocked seam-hooks, said adhesive sealant being the copolyester product of claim 4.

10. A pellicular laminating component for preparing a laminated assembly resistant to delamination at temperatures as low as −20° F. consisting of a heat-resistant hydrophobic pellicular lamina having a thin continuous coating up to several mils thickness of the fusible copolyester product of claim 2 on at least one of the two face surfaces of said pellicular lamina.

11. The article of claim 10 wherein said pellicular lamina is ethylene terephthalate polyester film.

12. The article of claim 10 wherein said pellicular lamina is heat-resistant metal foil which is infusible at a temperature at least 50° F. above the stick melt temperature of said fusible copolyester.

13. A laminated assembly consisting of a first lamina of wood, a second lamina of wood, and there between a pellicular laminating adhesive component having one adhesive coated face thereof adhesively contiguous with said first wood lamina and the second adhesive coated face thereof adhesively contiguous with said second wood lamina, said pellicular adhesive component consisting of a heat-resistant metal foil having on each of the two face surfaces thereof a thin continuous layer up to several mils thickness of a fusible adhesive consisting essentially of the copolyester product of claim 2, said heat-resistant metal foil having the characteristic of being infusible at temperatures ordinarily used to fuse said fusible copolyester ranging up to about 50° F. above the stick melting point of said copolyester.

References Cited in the file of this patent

UNITED STATES PATENTS

| | | |
|---|---|---|
| 1,714,173 | Kessler et al. | May 21, 1929 |
| 2,019,510 | Sorenson | Nov. 5, 1935 |
| 2,241,312 | Luty | May 6, 1941 |
| 2,401,987 | Taylor et al. | June 11, 1946 |
| 2,445,553 | Beavers | July 20, 1948 |
| 2,479,342 | Gibbons et al. | Aug. 16, 1949 |
| 2,562,878 | Blair | Aug. 7, 1951 |
| 2,601,284 | Hemming | June 24, 1952 |
| 2,623,033 | Snyder | Dec. 23, 1952 |
| 2,683,100 | Edgar et al. | July 6, 1954 |
| 2,699,417 | Repsher | Jan. 11, 1955 |
| 2,711,380 | Pintell | June 21, 1955 |
| 2,720,500 | Cody | Oct. 11, 1955 |
| 2,720,507 | Caldwell | Oct. 11, 1955 |
| 2,730,983 | Campbell et al. | Jan. 17, 1956 |
| 2,742,390 | Beck | Apr. 17, 1956 |
| 2,744,087 | Snyder | May 1, 1956 |
| 2,765,251 | Williams | Oct. 2, 1956 |
| 2,801,648 | Anderson et al. | Aug. 6, 1957 |
| 2,876,725 | Buck | Mar. 10, 1959 |